United States Patent
Cushing

[11] Patent Number: 5,926,317
[45] Date of Patent: *Jul. 20, 1999

[54] MULTILAYER THIN FILM DIELECTRIC BANDPASS FILTER

[75] Inventor: David Henry Cushing, Greely, Canada

[73] Assignee: JDS Fitel Inc., Nepean, Canada

[ * ] Notice: This patent is subject to a terminal disclaimer.

[21] Appl. No.: 08/743,734

[22] Filed: Nov. 6, 1996

[51] Int. Cl.⁶ ...................................... G02B 5/28
[52] U.S. Cl. ............................ 359/588; 359/589; 359/900
[58] Field of Search ..................... 359/588, 590, 359/589, 580, 900

[56] References Cited

U.S. PATENT DOCUMENTS

| | | | |
|---|---|---|---|
| 4,373,782 | 2/1983 | Thelen | 359/588 |
| 4,900,137 | 2/1990 | Carter | 359/580 |
| 5,274,661 | 12/1993 | Von Gunten et al. | 359/580 |

FOREIGN PATENT DOCUMENTS

| | | | |
|---|---|---|---|
| 57-212403 | 12/1982 | Japan | 359/588 |
| 1270042 | 4/1972 | United Kingdom | 359/589 |

*Primary Examiner*—Cassandra Spyrou
*Assistant Examiner*—John Juba, Jr.
*Attorney, Agent, or Firm*—Neil Teitelbaum & Associates

[57] ABSTRACT

A design for producing bandpass filters with passbands that are centered at the same wavelength for each mode of polarization. Filters are of the all-dielectric type that consist of single and multiple cavities of bandpasses. All of the layers are of the Quarter Wave type for ease of manufacture with the possible exception of the last few layers being modified to reduce reflection into a new media. The basic structure of the multi-layer bandpass filter is as follows: $(XY)^n(YY)(XX)^m(YY)(YX)^n$ where n and m are integers and wherein X is one of a high refractive index layer and a low refractive index layer; and, wherein Y is the other of the high and low refractive index layer, X and Y being opposite indexes of refraction.

13 Claims, 9 Drawing Sheets

| SUBSTRATE |
|---|
| STACK #1 |
| HW LOW INDEX |
| STACK #2 |
| QW LOW INDEX |
| STACK #3 |
| HW LOW INDEX |
| STACK #4 |
| EMERGENT MEDIUM |

Figure 1    *PRIOR ART*

| SEMI- MIRROR |
|---|
| HALF WAVE |
| SEMI- MIRROR |

Figure 2    *PRIOR ART*

| HIGH INDEX |
|---|
| LOW INDEX |
| HIGH    " |
| ..... |
| HIGH    " |
| LOW    " |
| HIGH INDEX |

Figure 3    *PRIOR ART*

MULTILAYER THIN FILM DIELECTRIC BANDPASS FILTER

FIELD OF THE INVENTION

This invention relates to multi-layer dielectric bandpass filters, and more particularly to multi-cavity multi-layer dielectric bandpass filters with layer structures having two materials wherein the layers are comprised of quarter wave multiples, however, with the exception, preferably that the layers near the beginning and end may have non quarter-wave thickness' for reducing reflections caused by mismatch to the adjoining media.

BACKGROUND OF THE INVENTION

It is generally desirable to have bandpass filters that do not have degradation in transmission properties when they are used at an angle of incidence to the light path. Filters based on optical interference principles are highly versatile, and may be designed for use throughout the entire optical spectrum.

Multi-cavity filters have been manufactured for more than 40 years. The usual approach of filter designers has been to simply anti-reflect the equal length cavity structures to the substrate and the medium. For this simple structure, use at an angle yields filters that for the two polarization modes exhibit different central wavelengths. These types of filters are described in detail by P. W. Baumeister, in, "Optical Coatings Technology," lecture notes for the five-day short course engineering 190.01 at the Continuing Education Institute, Jun. 16–20, 1986, Chapter 1, pg. 1-38–1-41. To lessen this problem, the need to modify the cavity properties was investigated thoroughly by experts in the thin film field. P. Baumeister, "in a paper entitled Bandpass design-applications to non-normal incidence", in Applied Optics 31, 504–512 (1992) where a standing wave ratio technique to match reflective zones by applying microwave filter synthesis was used. These cavities were adjusted to optimize a single angle. T. Yanagimachi et. al., in a paper entitled "High-performance and highly stable 0.3-nm-full-width-at-half-maximum interference optical filters," Applied Optics 33, 3513–3517 (1994), used a staggered thickness approach that is useful for single cavity filters. However, the wavelengths for each polarization vary as the angle is modified. G. P. Konukhov and E. A. Nesmelov, in a paper entitled "To the theory of a dielectric narrow-band filter," Journal of Applied Spectroscopy, vol. 11. pg. 468–474, (1969) describe using a third material for the half wave layers; this technique works well in theory, but in practice there are limits on the choices available. Furthermore, there also may be long-term stability concerns with the various materials.

SUMMARY OF THE INVENTION

It is an object of this invention to provide a multilayer thin film structure that overcomes some of the disadvantages of the aforementioned prior art.

The present invention provides a multilayer film having alternating layers of two transparent dielectric films with dissimilar indices of refraction. In a preferred embodiment, the invention utilizes anti-reflection from the filter structure to the substrate and output interfaces (if necessary) and, also comprises cavities that contain three-quarter wave layers to adjust the coincidence of polarization modes. Providing as the central half wave in a cavity the combination of: one half wave of opposite index material; one (or more) half wave(s) of same index material; and one half wave of opposite index material, provides a filter wherein the "s" polarization peak is fully within the band of the "p" polarization peak. Moreover, centering of the peaks occurs with further adjustments to the mirror stacks. The number of and positions of three-quarter waves necessary to achieve coincidence varies with the indices of refraction selected to manufacture the filter.

In accordance with the invention, there is provided, a multi-layer bandpass filter comprising: a resonant cavity, including, a first quarter-wave stack; a half-wave array of: one half-wave low index material, one half-wave or multiple thereof of high index material, and one half-wave low index material; and, a second quarter-wave stack, wherein the first and second quarter wave stacks each have an even number of layers, and wherein the first stack is the mirror of the second stack, wherein the layers are opposite in order. Furthermore, a plurality of these resonant cavities may be provided spaced by a quarter wave low refractive index layer of material.

In accordance with the invention, there is further provided, a bandpass filter comprising: a plurality of resonant cavities wherein the cavities each include, a first stack of high and low index quarter-wave layers; a half-wave array of: one half-wave low index material, one half-wave or multiple thereof of high index material, and one half-wave low index material; and, a second stack of low and high index quarter-wave layers, wherein the first and second quarter wave stacks each have an even number of layers, and wherein the first stack is the mirror of the second stack, wherein the cavities are separated by a quarter wave of low index material.

In accordance with the invention, there is further provided, a bandpass filter comprising: a plurality of resonant cavities wherein the cavities each include, a first stack of high and low index quarter-wave layers; a half-wave array of: one half-wave high index material one half-wave or multiple thereof of low index material, and one half-wave high index material; and, a second stack of low and high index quarter-wave layers, wherein the first and second quarter wave stacks each have an odd number of layers, and wherein the first stack is the mirror of the second stack, and, wherein the cavities are separated by a quarter wave of low index material.

In accordance with the invention a multi-layer bandpass filter is provided wherein some of the multi-layers are a high refractive index material and some of the layers are an opposite, low refractive index material. The filter comprises, a resonant cavity having a half-wave or multiple half-wave spacer layer of a first predetermined refractive index sandwiched between and contacting half-wave layers of a different opposite index, said half-wave layers of the different opposite index being sandwiched between layers defining two quarter-wave stacks of alternating high and low index material, the quarter-wave layers adjacent and contacting the half-wave layers of the different and opposite index being of substantially the same different and opposite index, the two quarter-wave stacks each having a same number of alternating layers and being opposite in order.

In accordance with the invention a multi-layer bandpass filter is provided comprising the following layer structure: $(XY)^n(YY)(XX)^m(YY)(YX)^n$ where n and m are integers and wherein X is one of a high refractive index layer and a low refractive index layer; and, wherein Y is the other of the high and low refractive index layer, X and Y being opposite indexes of refraction.

Yet, in accordance with another aspect of the invention, in a bandpass filter having a half wave spacer layer of low index material in-between two reflective stacks of alternating high and low index material, wherein the two stacks are oppositely ordered, a method of providing a filter that is less sensitive to the polarization of incident light comprises the step of:

providing one or more half waves of high index material adjacent to and between the spacer layer and the two reflective stacks. Alternatively, in a bandpass filter having a half wave spacer layer of high index material in-between two reflective stacks of alternating low and high index material wherein the two stack are oppositely ordered, a method is providing a filter that is less sensitive to the polarization of incident light comprises the step of:

providing one or more half waves of high index material adjacent to and between the spacer layer and the two reflective stacks.

In accordance with the invention, there is further provided a bandpass filter as defined heretofore. wherein one or more half wave layers are added to one or more predetermined layers of one or more of the stacks to fine tune relative positions of diverse polarization peaks in a response of the bandpass filter. It should be noted that adding one or more half wave layers to one or more predetermined quarter wave layers of a stack can be realized by physically adding one or more half wave layers to an existing layer, or more practically, by depositing a layer having a thickness of at least a three quarter wave layer or greater.

BRIEF DESCRIPTION OF THE DRAWINGS

Exemplary embodiments of the invention will now be described in conjunction with the drawings, in which:

FIG. 1 is a cross sectional view of a conventional prior art multi-cavity dielectric filter;

FIG. 2 is a cross sectional view of a prior art solid etalon filter;

FIG. 3 is a cross sectional view of a prior art Quarter-wave stack;

GENERAL INFORMATION ABOUT FILTER CONSTRUCTION

Filters for wavelength division multiplexers and other communication industry applications require very straight slopes with low loss and virtually no ripple. Typical bandwidths range from 0.5 nm to 100 nm for the wavelength range 1250 to 1650 nm. There are many other applications for filters that would benefit from this improvement in technology.

The simplest resonant cavity filter consists of two partial reflectors separated by a half wave multiple layer of transparent dielectric material (similar to an Etalon), shown in FIG. 2.

For all-dielectric filters, the reflectors include alternating layers of high and low index materials exemplified in FIG. 3. The thickness of each layer is adjusted to be a Quarter-wave at the wavelength of the desired filter. Each reflector (which may be only one layer) is called a Quarter-wave stack. The bandwidth of the filter is a function of the Reflectance of Quarter-wave stacks in the structure.

A filter cavity is the basic building block for all-dielectric interference filters. This consists of two identical reflectors made from Quarter-wave stacks separated by a Half wave (or multiple half-wave) layer. Cavities are deposited on top of other cavities, with a quarter-wave layer of low index material between, to sharpen the slopes. This produces a multi-cavity filter (FIG. 1).

When the filter is illuminated at an angle it will produce different spectral properties for each mode of polarization. If the angle is large compared to the bandwidth of the filter, completely different wavelengths are selected by the filter. In any case the average polarization response curve is distorted and the resulting filter is undesirable.

DETAILED DESCRIPTION

Figure 4:
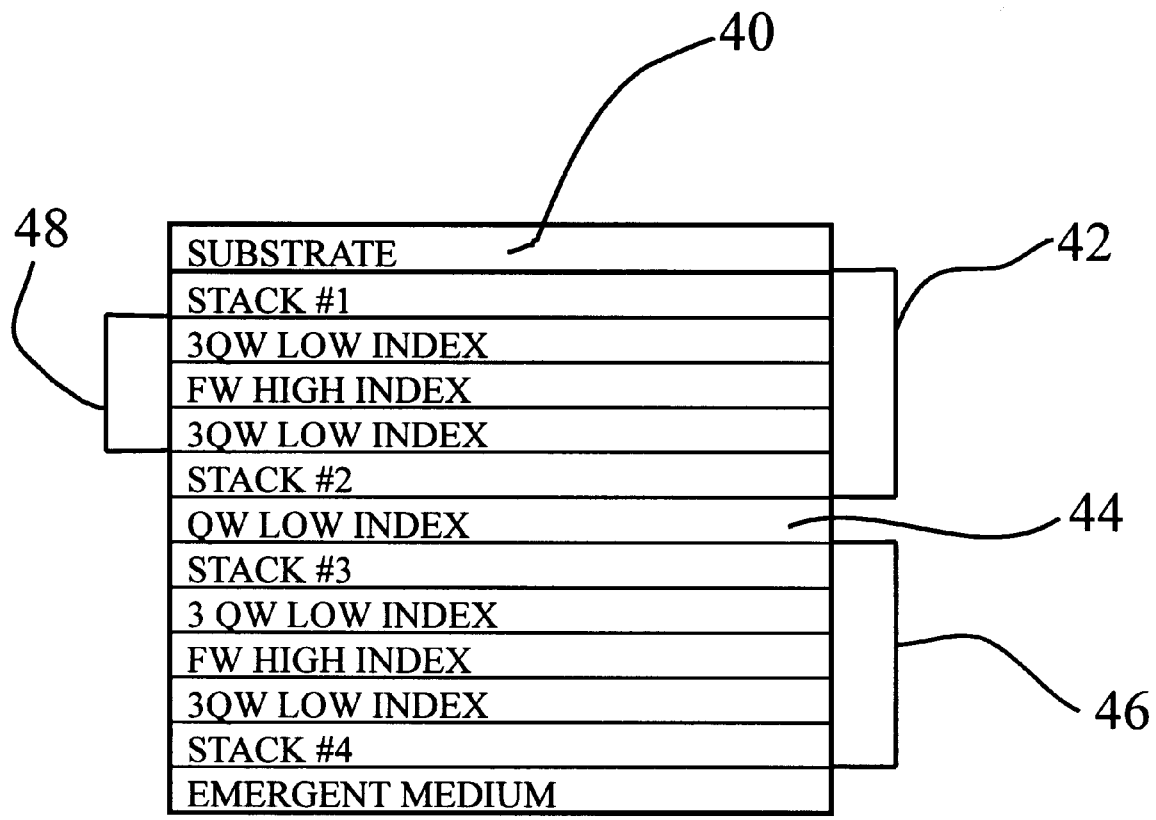
FIG. 4 is a cross sectional view of a multi-cavity bandpass filter ensemble in accordance with the invention.

As shown in FIG. 4, the filter ensemble in accordance with the invention comprises a transparent substrate 40, a filter cavity 42 consisting of N layers, a low index layer 44, a second cavity 46 having N or (N+4) layers; and possibly more cavities, each cavity followed by low index layers, another filter cavity consisting of N layers, and another matching layer (if necessary). For most cases, the matching layer is a low index quarter wave. The material and index of refraction of the matching layer(s) may be different from that of the low index material. The cavities are comprised of quarter wave thick layers of alternating high and low index materials. In this invention half waves are added to certain of these layers, thereby increasing their thickness, to displace the center wavelengths of the polarizations in order to improve the coincidence of the peaks. The first material in a cavity is high index and is followed by a low index material. With respect to the teachings of the prior art, for the simplest case the low index material is a multiple of half waves and is followed by a high index material i.e. HLLH each layer indicating a quarter wave thick high or low index material. Next, and between each cavity that follows, low index layers are placed. The next cavity could consist of the prior art layer structure HLH LL HLH for the simplest case. This may be repeated many times to produce a filter that has sharp slopes. The first cavity is then repeated. Finally another matching layer to the next medium is added as necessary.

In accordance with this invention, the structure is modified to: 3H LL 3H for the first and last cavities and the inner cavities have the form: HL3H LL 3HLH. More than four cavities will produce filters that have average polarization bandshapes with a large ripple at the half-power point for large angles of incidence. This may be objectionable. The invention becomes most useful when the number of layers in the reflectors is increased and the bandwidth of the filter is small. At this point, centering of the peaks becomes very important and layers next to the central area will need half-waves added to them, i.e. HLHLH 3L3H LL 3H3L HLHLH is an example of a cavity.

The substrate is transparent over the wavelength of interest and, may be made from a wide variety of materials including (but not limited to) glass, quartz, clear plastic, silicon, and germanium. The dielectric materials for this application have indices of refraction in the range 1.3 to beyond 4.0. The preferred materials are Magnesium Fluoride (1.38), Thorium Fluoride (1.47), Cryolith (1.35), Silicon Dioxide (1.46), Aluminum Oxide (1.63), Hafnium Oxide (1.85), Tantalum Pentoxide (2.05), Niobium Oxide (2.19), Zinc Sulphide (2.27), Titanium Oxide (2.37), Silicon (3.5), Germanium (4.0), and Lead Telluride (5.0). Other dielectric materials would serve as well.

Design of the filter is easily accomplished today with the aid of commercially available computer programs with optimization routines (i.e. TFCalc™ by Software Spectra Inc.). Design recipes are entered into the program and the spectral response is calculated. When the design with the proper size cavities is selected to match the required nominal bandwidth, optimization of the filter transmission is performed for the matching layers. The designer selects from a choice of materials to use in a quarter wave match or may choose to use the same low index material with thickness adjustments to accomplish the matching.

PREDICTIVE EXAMPLES

In order to demonstrate the improvement over prior art, an analysis of similar filters designed to provide a same degree of filtering will be performed. For FIGS. 5 through 9 the center wavelength at normal incidence is 1340 nm and the index of the H layers is 2.25 and the index of the L layers is 1.47. Within this specification the term "opposite index" is on occasion used, to distinguish between a high and low index material, thus a low index material may be referred to as having an opposite refractive index to a high index material. In FIGS. 5 through 9 the filters are all two cavity filters separated by a low index quarter wave layer.

Figure 5:
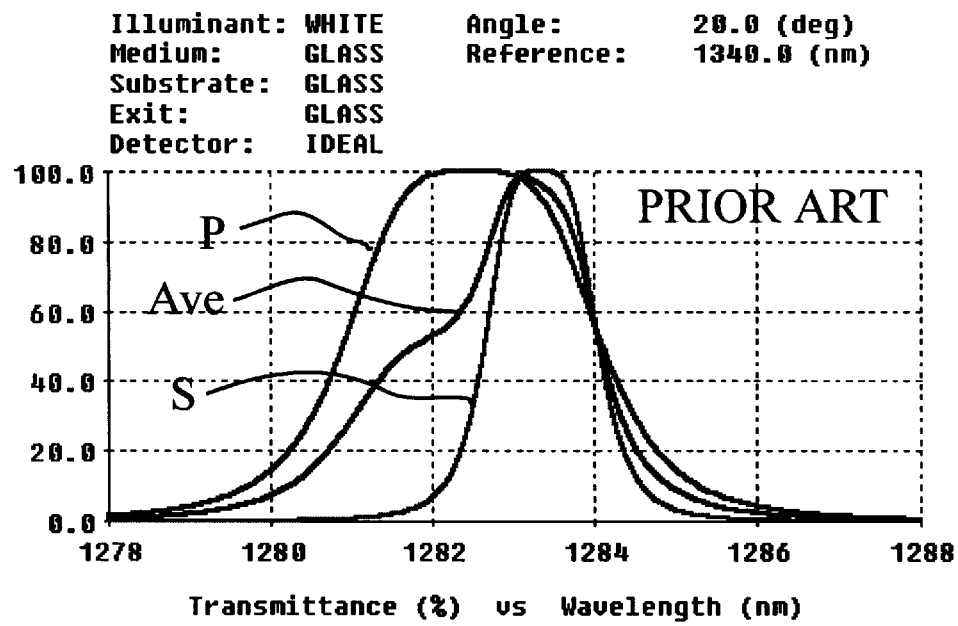
FIG. 5 is a graph representing the transmittance of a conventional two cavity filter, each cavity with twenty-five layers separated by a low index quarter-wave layer; the half-wave is of high index.
Figure 6:
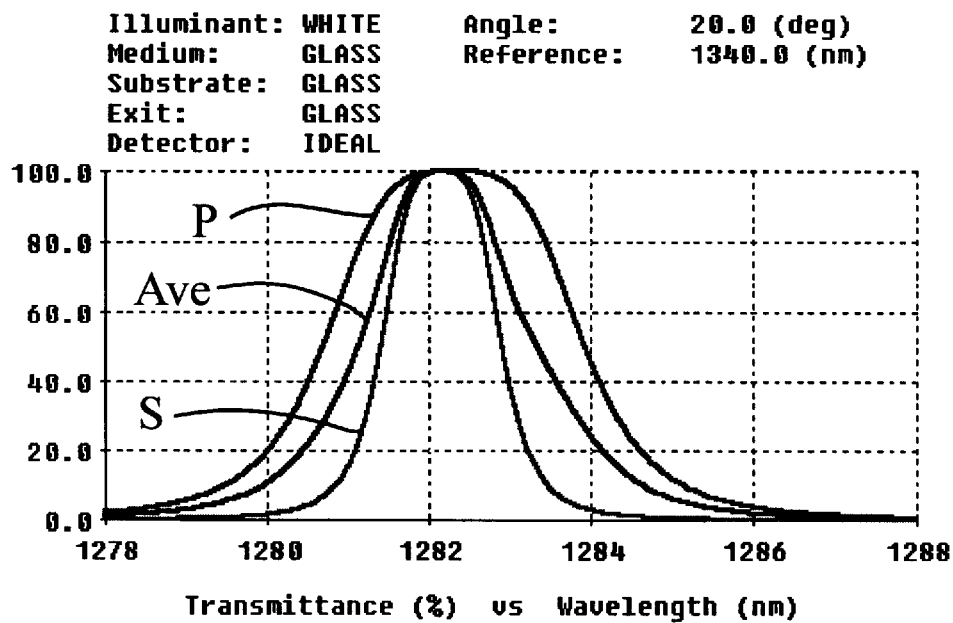
FIG. 6 is a chart representing the transmittance of a two cavity filter with 3 quarter-half wave-3 quarter spacer form, low index half wave, 47 layers, each cavity with twenty-three layers with the structure: ((HL)5 HHH LL HHH (LH)5) L ((HL)5 HHH LL HHH (LH)5)
Figure 7:
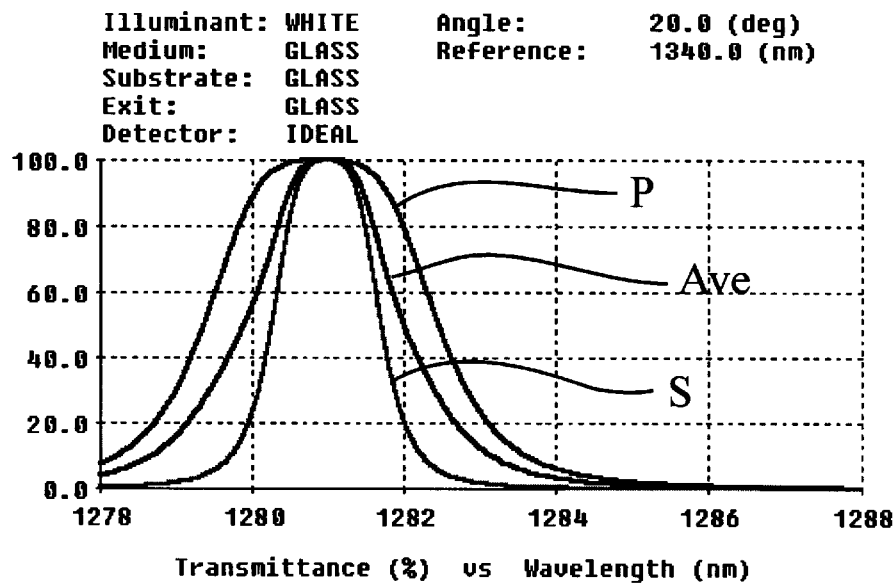
FIG. 7 is a graph representing the transmittance of a two cavity filter with 3 quarter-half wave-3 quarter spacer form, low index half wave, additional 3 quarter waves for fine correction, 47 layers, each cavity with twenty-three layers with the structure: ((HL)5 HHH LL HHH LHLL (LH)4) L ((HL)5 HHH LL HHH LHLL (LH)4)
Figure 6A:
FIG. 6a is a diagrammatic presentation of the layer structure of the two cavity filter in FIG. 6.
Figure 7A:
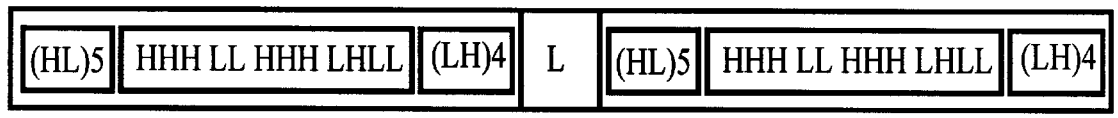
FIG. 7a is a diagrammatic presentation of the layer structure of the two cavity filter in FIG. 7.

FIG. 5 is a graph representing the transmittance of a conventional two cavity filter, each cavity with twenty-five layers The half wave is of high index. The structure is: ((HL)6 HH (LH)6 L)2 with the last L removed. The curves from left to right are "p" polarized, average polarization, and "s" polarized. In FIG. 6, four less layers are used in this two cavity filter. The structure is: ((HL)5 HHH LL HHH (LH)5) L ((HL)5 HHH LL HHH (LH)5) as shown in FIG. 6*a*. Centering of the passbands is now within 0.18 nm for the conditions of the design. A further refinement of the design follows. FIG. 7 is a graph representing a the transmittance of a two cavity filter, each cavity with twenty-three layers with the structure: ((HL)5 HHH LL HHH LHLL (LH)4) L ((HL)5 HHH LL HHH LHLL (LH)4) as shown in FIG. 7*a*. Centering is now within 0.1 nm.

Figure 8:
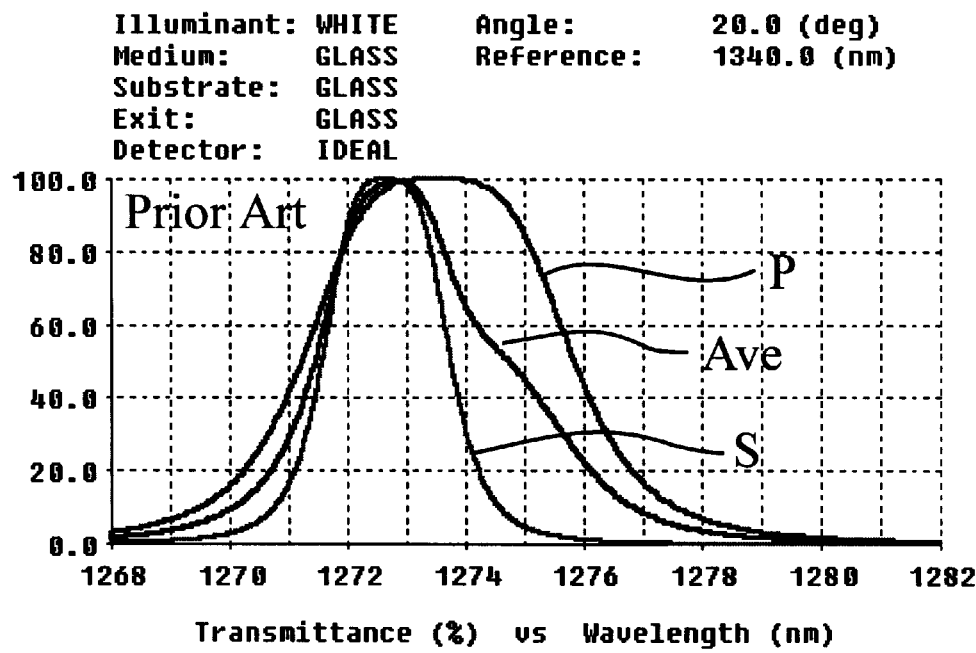
FIG. 8 is a graph representing the transmittance of a conventional two cavity filter, each cavity with twenty-three layers separated by a low index quarter-wave layer; the half-wave is of low index.
Figure 9:
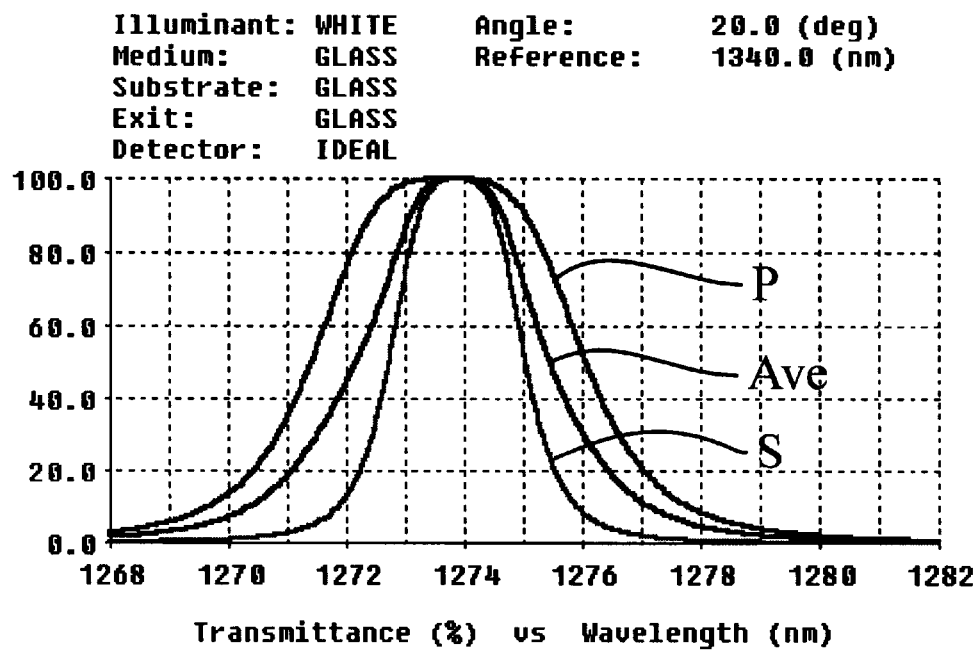
FIG. 9 is a graph representing the transmittance of a two cavity filter with 3 quarter-half wave-3 quarter spacer form, high index half wave, in accordance with the invention, each cavity with twenty-one layers with the structure: ((HL)5 LL HH LL (LH)5) L ((HL)5 LL HH LL (LH)5)
Figure 9A:
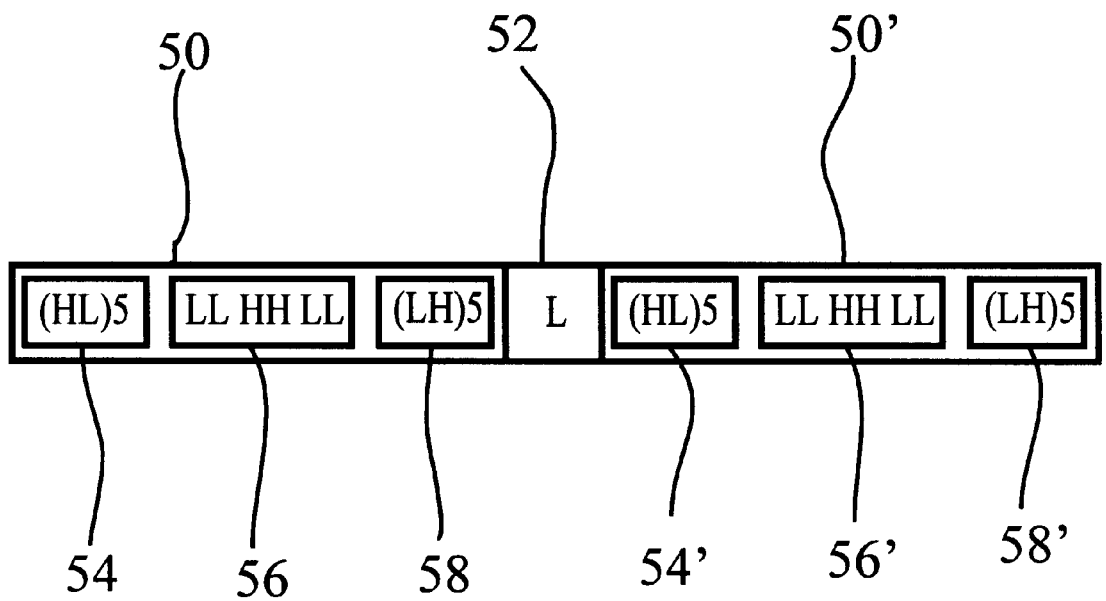
FIG. 9a is a diagrammatic presentation of the layer structure of the two cavity filter in FIG. 9.

For a filter with a low index half-wave, the design of FIG. 8 was selected. The graph represents the transmittance of a conventional two cavity filter, each cavity with twenty-three layers separated by a low index quarter-wave layer. The half wave is of low index. As above, the curves from left to right are "p", average, and "s" polarizations. An important observation is that in this instance the "s" polarization curve is on the left side of center, the opposite of FIG. 5. To achieve centering the design was altered as shown in FIG. 9 which is a two cavity filter, each cavity with twenty-one layers having the structure: ((HL)5 LL HH LL (LH)5) L ((HL)5 LL HH LL (LH)5) as shown in FIG. 9*a*. Centering is within 0.1 nm again. FIG. 9*a* is a diagrammatic presentation of the components of a two cavity filter showing the first cavity 50 and the second cavity 50' being separated by a quarter wave of low index material 52. The first cavity 50 is composed of a first stack 54, a half-wave array 56, and a second stack 58, wherein the first stack 54 is the mirror of the second stack 58. The second cavity 50' is composed of a first stack 54', a half-wave array 56', and a second stack 58', wherein the first stack 54' is the mirror of the second stack 58'.

The wavelength change from normal incidence follows different equations for the different index half-waves. Filters with low index half-waves shift further than those made with high index half waves for conventional designs. The "s" polarized light is typically shifted the most for low index spacer filters and the least for high index spacer filters. This invention shifts ths "s" polarization performance towards that of the "p" polarization for both varieties.

Comparison of the "p" polarization wavelength shifts is interesting. The behavior of the designs featured in FIGS. 6 and 7 mimic that of the high index spacer type of FIG. 5. The wavelength change for the design of FIG. 9 corresponds closely to that for the low index spacer type of FIG. 8. If the splitting reduction was produced with the method taught by G. P. Konukhov and E. A. Nesmelov, the peak wavelengths would approach the median value no matter which index type was selected. This demonstrates that the mechanism of this invention is quite different from G. P. Konukhov and E. A. Nesmelov's.

Figure 13:
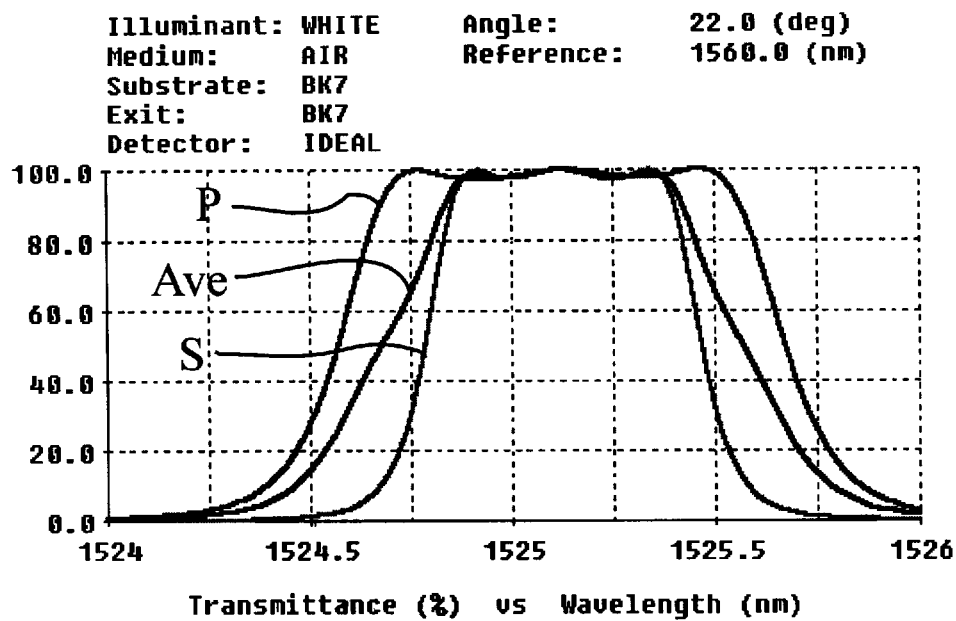
FIG. 13 is a chart representing the transmittance of a three cavity filter of 0.9 nm bandwidth made in accordance with the teachings of this invention.
Figure 14:
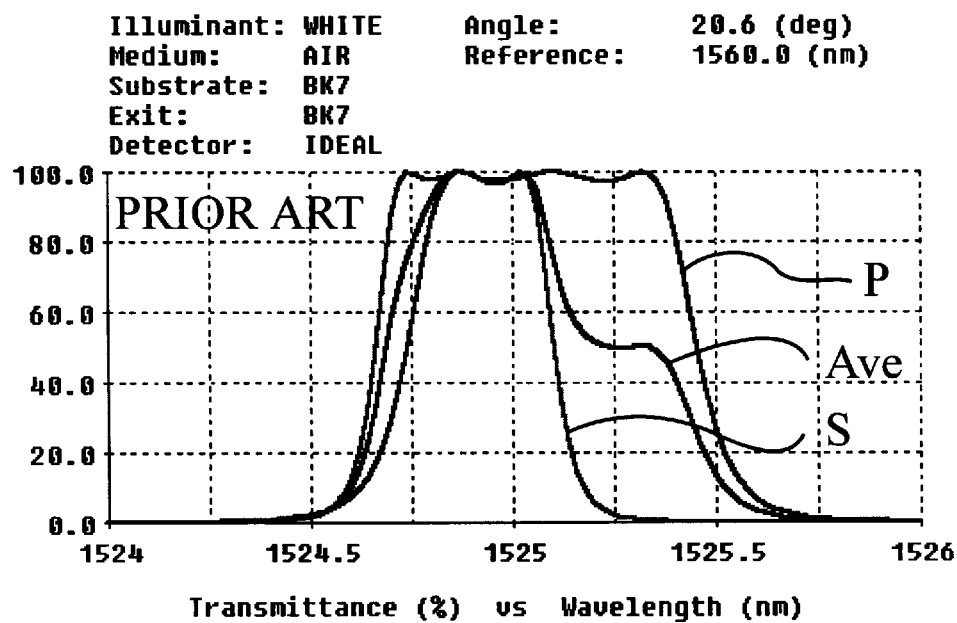
FIG. 14 is a graph representing the transmittance of a three cavity prior art filter of 0.9 nm bandwidth made with a conventional approach; The structure is: ((HL)8 (LH)8 L)3 with the last 2 layers modified to 1.3 Quarter-waves each; The chart is for a large angle (20.6 degrees) in air.

This shifting factor may be utilized to advantage by allowing a small cone angle with less shape distortion, or conversely sweeping a large wavelength change with a small angle with true peak selection. FIG. 13, in accordance with this invention, shows the response of a three cavity filter (84 layers) designed for tilt tuning for a 35 nm wavelength range. The curves are symmetrical and the half-bandwidth is identical with that at normal incidence. The structure is: ((HL)6 HHH LL HHH L H LL (LH)5 L)3 with the last 2 layers modified to 1.3 Quarter-waves each; The chart is for a large angle (22 degrees) in air; FIG. 14 is graph of a response showing a comparison of a conventional filter (90 layers) to cover the same range. The "s" polarized light is to the left of the average and "p" polarized light for this bandwidth.

Figure 12:
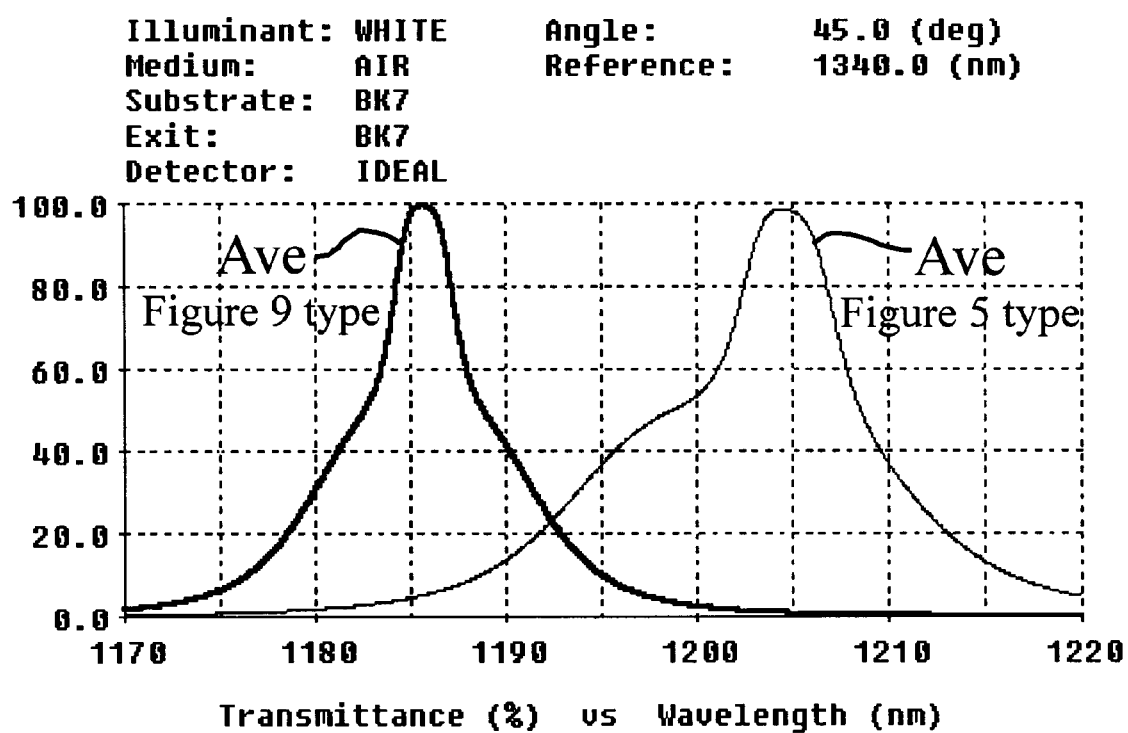
FIG. 12 is a comparison of output response for the filters in accordance with the invention of FIG. 9 and the prior art filter response of FIG. 5.

Referring to FIG. 12, a comparison is illustrated between FIG. 9 type in accordance with the invention (left) vs. FIG. 5 type in accordance with the prior art (right); This graph is for average polarization at 45 degrees in air with low index materials. The index for H is 1.88 and the index of L is 1.38. The last two layer thickness' were adjusted to anti-reflect by increasing to 1.3 Quarter-waves each;

The range of indices that this invention is useful for is only limited by the ratio of high index to low index materials used for filter construction. For very large angles, FIG. 12 demonstrates that improvement in performance is possible even with a small index ratio. Materials with indices similar to those in FIG. 12 (1.88 and 1.38) are used in the Ultraviolet area of the spectrum. If the ratio becomes much smaller than 1.3, then the angular characteristics may not warrant the extra layers of this invention.

Figure 10:
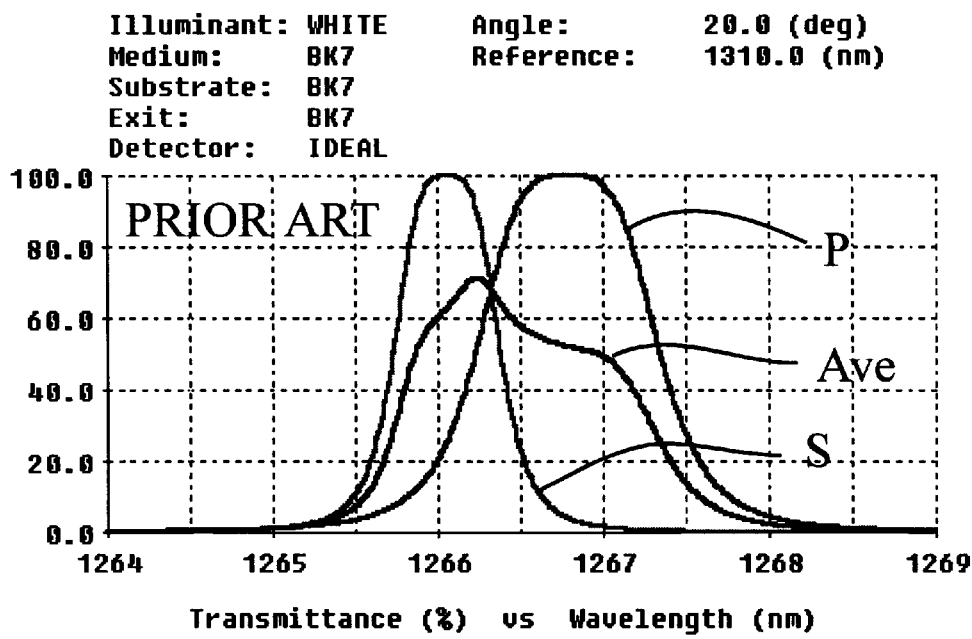
FIG. 10 is a graph representing the transmittance of a conventional two cavity filter in accordance with the prior art, each cavity with fifteen layers separated by a low index quarter-wave layer and ending with a low index quarter-wave layer; the half-wave is of low index; the high index is 4.0 and the low index is 1.75; the structure is: ((HL)4 (LH)4 L)2.
Figure 11:
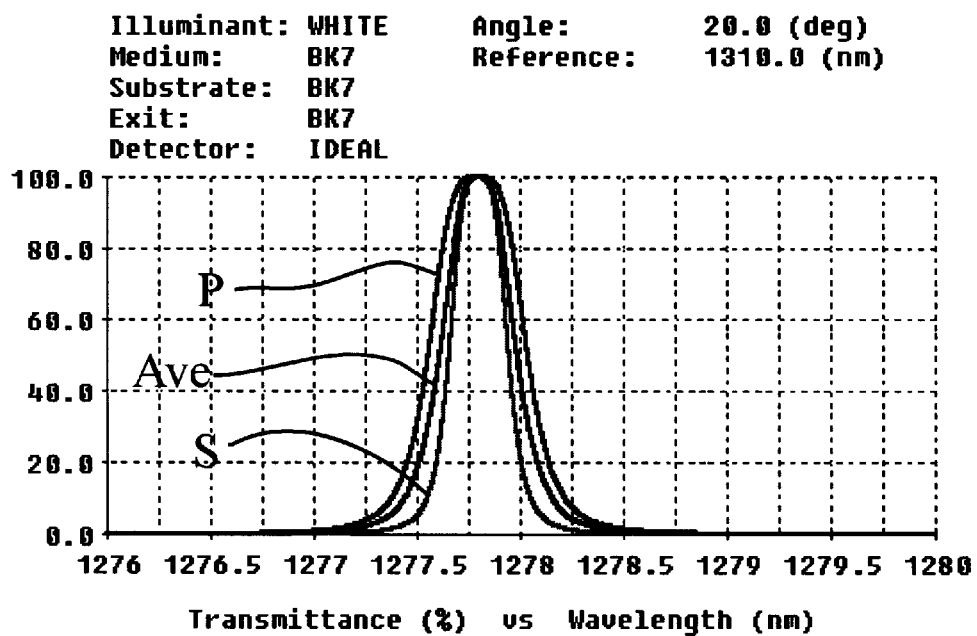
FIG. 11 is a graph representing the transmittance of a two cavity filter with high index materials and adjusted layer thickness in accordance with this invention, each cavity with fifteen layers with the structure: ((H 3L H 3L H 5L 5H LL 5H 3L H 3L H 3L H) L )2, with the same refractive index as in FIG. 10.

At the other end of the spectrum, the Infrared, Germanium is a preferred high index material having an index of refraction of 4.0. Wavelength splitting remains a significant problem for narrow band filters. FIG. 10 shows the degree of splitting for a 32 layer 2 cavity filter with the high index equal to 4.0 and the low index equal to 1.75. the structure is: ((HL)4 (LH)4 L)2. To induce centering requires a large modification of the stacks. The preferred design from a fabrication point of view is: ((H 3L H 3L H 5L) 5H LL 5H (5L H 3L H 3L H) L)2. This would produce low stress compared to thicker layers which would yield a similar result.

Of course, numerous other embodiments may be envisaged, without departing from the spirit and scope of the invention.

What I claim is:

1. A multi-layer bandpass filter comprising:
   a resonant cavity, including, a first quarter-wave stack; a half-wave array of: one half-wave low index material, one half-wave or multiple thereof of high index material, and one half-wave low index material, and a second quarter-wave stack, wherein the first and second quarter wave stack each have an even number of layers, and wherein the layers of the two stacks are substantially opposite in order.

2. A multi-layer bandpass filter as defined in claim 1, wherein the first stack is the mirror of the second stack.

3. A bandpass filter as defined in claim 1, comprising a plurality of resonant cavities, each cavity being spaced by a quarter-wave of low index material.

4. A bandpass filter as defined in claim 1 further comprising at least one half wave layer added to at least one predetermined layer of at least one of the stacks to fine tune relative positions of diverse polarization peaks in a response of the bandpass filter.

5. A bandpass filter comprising:
   a plurality of resonant cavities wherein the cavities each include, a first stack of high and low index quarter-wave layers; a half-wave array of: one half-wave low index material, one half-wave or multiple thereof of high index material, and one half-wave low index material; and, a second stack of low and high index quarter-wave layers, wherein the first and second quarter wave stacks each have an even number of layers, and wherein the cavities are separated by a quarter wave of low index material.

6. A bandpass filter as defined in claim 5, wherein the first stack is the mirror of the second stack.

7. A bandpass filter as defined in claim 5 further comprising at least one half wave layer added to at least one predetermined layer of at least one of the stacks to fine tune relative positions of diverse polarization peaks in a response of the bandpass filter.

8. A bandpass filter comprising:
   a plurality of resonant cavities wherein the cavities each include, a first stack of high and low index quarter-wave layers; a half-wave array of: one half-wave high index material, one half-wave or multiple thereof of low index material, and one half-wave high index material; and, a second stack of low and high index quarter-wave layers, wherein the first and second quarter wave stacks each have an odd number of layers, and wherein the cavities are separated by a quarter wave of low index material.

9. A bandpass filter as defined in claim 8, wherein the first stack is the mirror of the second stack.

10. A bandpass filter as defined in claim 8 further comprising at least one half wave layer added to at least one predetermined layer of at least one of the stacks, thereby increasing the thickness of at least one of the stack layers to fine tune relative positions of diverse polarization peaks in a response of the bandpass filter.

11. A multi-layer bandpass filter wherein some of the multi-layers are a high refractive index material and some of the layers are of an opposite character, low refractive index material, the filter comprising a resonant cavity having a half-wave or multiple half-wave spacer layer of a first predetermined refractive index sandwiched between and contacting half-wave layers of an opposite character with respect to the spacer layer, said half-wave layers of opposite character being sandwiched between layers defining two quarter-wave stacks of alternating high and low index material, the quarter-wave layers adjacent and contacting the half-wave layers of opposite character being of substantially the same opposite refractive index, said quarter-wave stacks further comprising at least one half wave layer added to at least one predetermined layer of at least one of the stacks to fine tune relative positions of diverse polarization peaks in a response of the bandpass filter.

12. A multi-layer bandpass filter comprising the following layer structure:
   $(XY)^n(YY)(XX)^m(YY)(YX)^n$ where n and m are integers and wherein X is one of a high refractive index layer and a low refractive index layer; and, wherein Y is the other of the high and low refractive index layer, X and Y having indexes of refraction opposite in character and substantially the same optical thicknesses; and wherein $(XY)^n$ and $(YX)^n$ are quarter-wave stacks wherein the filter further comprises half wave layers are added to predetermined layers of at least one of $(XY)^n$ and $(YX)^n$ to fine tune relative positions of diverse polarization peaks in a response of the bandpass filter.

13. In a bandpass filter having a half wave spacer layer of high index material in-between two reflective stacks of alternating low and high index material wherein the two stacks are oppositely ordered, a method of providing a filter that is less sensitive to the polarization of incident light, said method comprising the step of:
   providing at least one half wave layer of low index material adjacent to the spacer layer and the two reflective stacks.

* * * * *